UNITED STATES PATENT OFFICE.

WILFRID PAUL HEATH, OF CHICAGO, ILLINOIS.

PROCESS OF MANUFACTURING CANDY.

1,384,319.

No Drawing.

Specification of Letters Patent. Patented July 12, 1921.

Application filed January 12, 1920. Serial No. 350,950.

*To all whom it may concern:*

Be it known that I, WILFRID PAUL HEATH, a citizen of the United States, resident of Chicago, in the county of Cook and State of Illinois, have invented certain new and useful Improvements in Processes of Manufacturing Candy, of which the following is a specification.

In the manufacture of candy it has been the practice to agitate or beat the "candy mix" to incorporate therein cells of air, thus reducing the specific gravity of the candy in the process. The air thus incorporated in the candy is often dust and germ laden, rendering the candy impure and unwholesome.

The object of my invention is to exclude the air from the candy mix and to flavor the candy by injecting into the mix prior to or during the agitation thereof a flavoring gas preferably carbon dioxid, which not only imparts a desired flavor to the candy but increases its purity and wholesomeness.

In carrying out my invention I inject into the candy mix while it is contained in a suitable heating chamber and in a liquid or semi-liquid condition, carbon dioxid or other suitable sterile gas from a cylinder under pressure or from any other suitable source of supply. Any suitable means may be employed for distributing the gas through the material contained in the beating chamber, such as a perforated pipe extending through the bottom of the chamber to which the gas supply pipe may be connected. By sterile gas is meant any gas inert to produce chemical changes in the candy.

Prior to starting the beaters in motion enough gas is admitted to completely fill the chamber above the level of the mixture, thereby expelling the air therefrom. The beating paddles are then put in motion, and small currents of gas are admitted during the beating process. The beating blades or paddles incorporate the heavier and sterile gas into the mixture thus giving it a gaseous flavor.

The process may be employed in the manufacture of all kinds of candy. I have found it particularly advantageous in the manufacture of marshmallows.

The gas thus incorporated in the candy mixture remains in the candy to a considerable extent, thus reducing the specific gravity, and adding a desirable flavor. As the gas takes the place of the air cells usually incorporated in the candy, which are often germ and dust laden, it materially adds to the purity and wholesomeness of the candy as an article of food.

I claim as my invention:

1. The process of manufacturing candy which consists in confining the candy mixture, while in a liquid or semi-liquid condition, in a suitable container, injecting a sterile gas into said container, and thereby driving the air therefrom, agitating or stirring said candy mixture to incorporate the gas into said mixture, and thereby reducing the specific gravity of said mixture and imparting a gaseous flavor thereto.

2. The process of manufacturing candy which consists in confining the candy mixture, while in a liquid or semi-liquid condition, in a suitable container, injecting carbon dioxid into said container, and thereby driving the air therefrom, agitating or stirring said candy mixture to incorporate the gas into said mixture, and thereby reducing the specific gavity of said mixture and imparting a gaseous flavor thereto.

In witness whereof, I have hereunto set my hand this 9th day of January, 1920.

WILFRID PAUL HEATH.

Witnesses:
ELIZABETH H. RYAN,
KATHRYN L. HICKMAN.